(12) United States Patent
Bono et al.

(10) Patent No.: US 9,305,071 B1
(45) Date of Patent: Apr. 5, 2016

(54) PROVIDING VIRTUAL STORAGE PROCESSOR (VSP) MOBILITY WITH INDUCED FILE SYSTEM FORMAT MIGRATION

(71) Applicant: EMC Corporation, Hopkinton, MA (US)

(72) Inventors: Jean-Pierre Bono, Westborough, MA (US); Frederic Corniquet, Le Pecq (FR); Miles A. de Forest, Bahama, NC (US); Himabindu Tummala, South Grafton, MA (US); Walter C. Forrester, Berkeley Heights, NJ (US)

(73) Assignee: EMC Corporation, Hopkinton, MA (US)

( * ) Notice: Subject to any disclaimer, the term of this patent is extended or adjusted under 35 U.S.C. 154(b) by 235 days.

(21) Appl. No.: 14/041,097

(22) Filed: Sep. 30, 2013

(51) Int. Cl.
*G06F 17/30* (2006.01)

(52) U.S. Cl.
CPC .................... *G06F 17/30575* (2013.01)

(58) Field of Classification Search
CPC ................................................ G06F 17/30079
See application file for complete search history.

(56) References Cited

U.S. PATENT DOCUMENTS

| | | | |
|---|---|---|---|
| 7,383,463 B2 | 6/2008 | Hayden et al. | |
| 7,769,722 B1 | 8/2010 | Bergant et al. | |
| 8,706,833 B1 | 4/2014 | Bergant et al. | |
| 8,996,837 B1 | 3/2015 | Bono et al. | |
| 9,092,290 B1 | 7/2015 | Bono et al. | |
| 2004/0210583 A1* | 10/2004 | Enko et al. | 707/10 |
| 2011/0197039 A1* | 8/2011 | Green et al. | 711/162 |
| 2012/0023233 A1* | 1/2012 | Okamoto et al. | 709/226 |
| 2013/0014103 A1* | 1/2013 | Reuther et al. | 718/1 |
| 2013/0282887 A1* | 10/2013 | Terayama et al. | 709/223 |

* cited by examiner

*Primary Examiner* — Khanh Pham
(74) *Attorney, Agent, or Firm* — BainwoodHuang

(57) ABSTRACT

A technique provides virtual storage processor (VSP) mobility with induced file system format migration. The technique involves receiving a command specifying (i) a source VSP which includes source file systems which store data in a source file system format, (ii) a destination, and (iii) a destination file system format. The technique further involves forming, in response to the command, a destination VSP which includes destination file systems. The technique further involves copying, while the source VSP is accessed by a set of host computers, data from the source file systems of the source VSP to the destination file systems of the destination VSP. The destination file systems store the copied data in the destination file system format. The technique further involves synchronizing, after the data is copied from the source file systems to the destination file systems, state changes between the source VSP and the destination VSP.

21 Claims, 10 Drawing Sheets

PROVIDING VIRTUAL STORAGE PROCESSOR (VSP) MOBILITY WITH INDUCED FILE SYSTEM FORMAT MIGRATION

BACKGROUND

Data storage systems typically include one or more physical storage processors (SPs) accessing an array of disk drives and/or electronic flash drives. Each SP is connected to a network, such as the Internet and/or a storage area network (SAN), and receives transmissions over the network from host computing devices ("hosts"). Each SP can support network attached storage (NAS) as well. The transmissions from the hosts include "IO requests," also called "host IOs." Some IO requests direct the SP to read data from an array, whereas other IO requests direct the SP to write data to the array. Also, some IO requests perform block-based data requests, where data are specified by LUN (Logical Unit Number) and offset values, whereas others perform file-based requests, where data are specified using file names and paths. Block-based IO requests typically conform to a block-based protocol, such as Fibre Channel or iSCSI (Internet SCSI, where SCSI is an acronym for Small Computer System Interface), for example. File-based IO requests typically conform to a file-based protocol, such as NFS (Network File System), CIFS (Common Internet File System), or SMB (Server Message Block), for example.

In some data storage systems, an SP may operate one or more virtual data movers. As is known, a virtual data mover is a logical grouping of file systems and servers that is managed by the SP and provides a separate context for managing host data stored on the array. A single SP may provide multiple virtual data movers for different users or groups. For example, a first virtual data mover may organize data for users in a first department of a company, whereas a second virtual data mover may organize data for users in a second department of the company. Each virtual data mover may include any number of host file systems for storing user data.

SUMMARY

Improved techniques involve providing virtual storage processor (VSP) mobility with induced file system format migration by migrating all file systems, i.e., host file systems as well as hidden configuration file systems (file systems which are not directly accessible to hosts and which store control data, personality data, metadata, etc.), of source VSPs to destinations. Such migration may be handled by a migration tool which is within the input/output (I/O) stack but above block-based storage and replication. Accordingly, all data is migrated (i.e., host data as well as configuration data). Furthermore, file system and file characteristics such as file system identifiers and inode numbers assigned to the files of the file systems can be preserved (i.e., identically assigned to the files storing the copied data at the destination) so that migration is transparent to the hosts (e.g., file handles in use by the hosts remain usable after migration).

One embodiment is directed to a method of providing VSP mobility and concurrent file system format migration. The method includes receiving, by processing circuitry, a VSP move command from a user, the VSP move command specifying (i) a source VSP which includes multiple source file systems which store data in a source file system format, (ii) a destination, and (iii) a destination file system format which is different than the source file system format. The method further includes forming, by the processing circuitry and in response to the VSP move command, a destination VSP which includes multiple destination file systems. The method further includes copying, by the processing circuitry and while the source VSP is accessed by a set of host computers, data from the multiple source file systems of the source VSP to the multiple destination file systems of the destination VSP. The multiple destination file systems store the copied data in the destination file system format. The method further includes synchronizing, by the processing circuitry and after the data is copied from the multiple source file systems to the multiple destination file systems, state changes between the source VSP and the destination VSP.

In some arrangements, the source VSP includes (i) a first set of configuration file systems storing source VSP configuration data and (ii) a first set of host file systems storing host data. In these arrangements, forming the destination VSP includes providing (i) a second set of configuration file systems to store destination VSP configuration data and (ii) a second set of host file systems to store a copy of the host data. The first and second sets of configuration file systems are transparent to the set of host computers (i.e., hidden from the set of host computer), and the first and second sets of host file systems being visible to the set of host computers (i.e., being accessible by the set of host computers).

In some arrangements which involve migration between formats having different block pointer sizes, the first set of configuration file systems and the first set of host file systems include existing inode structures to store the data using block pointers having a first block pointer size defined by the source file system format. In these arrangements, providing the second set of configuration file systems and the second set of host file systems includes provisioning the second set of configuration file systems and the second set of host file systems with new inode structures to store the copied data using block pointers having a second block pointer size defined by the destination file system format. The second block pointer size (e.g., 64-bits) is different than the first block pointer size (e.g., 32-bits).

It should be understood that, in the cloud context, the processing circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in providing VSP mobility and concurrent file system format migration.

One should appreciate that, in a conventional virtual data mover arrangement, the SP has a root file system with mount points to which the host file systems of each virtual data mover are mounted. Thus, the SP and all its virtual data movers form a single, large directory and all share a common namespace. Hosts can access their virtual data mover-managed data by connecting to the SP over the network, logging on, and specifying paths relative to the SP's root where their data are kept. The typical arrangement thus requires hosts to access data of a virtual data mover using paths that are referenced to and dependent upon the root of the SP.

In addition, settings for prescribing virtual data mover operations are conventionally stored in the root file system of the SP. Many of these settings are global to all virtual data movers operating on the SP; others may be specific to particular virtual data movers.

Unfortunately, the intermingling of virtual data mover content within an SP's root file system impairs the ease of mobility and management of virtual data movers. For example, administrators wishing to move a virtual data mover (e.g., its file systems, settings, and servers) from one SP to another SP must typically perform many steps on a variety different data objects. File systems, server configurations, and other settings may need to be moved one at a time. Also, as the contents of different virtual data movers are often co-located, care must be taken to ensure that changes affecting one virtual data mover do not disrupt the operation of other virtual data movers.

In contrast with the conventional approach, an improved technique for managing host data in a data storage apparatus provides VSPs as substantially self-describing and independent entities. Each VSP has its own namespace, which is independent of the namespace of any other VSP and is independent of the namespace of the SP's (i.e., the physical SP's) root file system. Each VSP also has its own network address. Hosts may thus access VSPs directly, without having to include path information relative to the root of the SP on which the VSPs are operated. VSPs can thus be moved from one physical SP to another with little or no disruption to hosts, which may in many cases continue to access the VSPs on the new SPs using the same paths as were used to access the VSPs on the original SPs.

In some examples, each VSP includes within its namespace a configuration file system storing configuration settings for operating the VSP. These configuration settings include, for example, network interface settings and internal settings that describe the VSPs "personality," i.e., the manner in which the VSP interacts on the network. By providing these settings as part of the VSP itself (e.g., within the file systems of the VSP), the VSP can be moved from one physical SP to another substantially as a unit. The increased independence of the VSP from its hosting SP promotes many aspects of VSP management, including, for example, migration, replication, failover, trespass, multi-tenancy, load balancing, and gateway support.

In some examples, the independence of VSPs is further promoted by storing data objects of VSPs in the form of respective files. These data objects may include, for example, file systems, LUNs, virtual storage volumes (vVols), and virtual machine disks (VMDKs). Each such file is part of a set of internal file systems of the data storage apparatus. Providing data objects in the form of files of a set of internal file systems promotes independence of VSPs and unifies management of file-based objects and block-based objects.

In accordance with improvements hereof, certain embodiments are directed to a method of managing host data on a data storage apparatus connected to a network. The method includes storing a network address and a set of host data objects accessible within a namespace of a virtualized storage processor (VSP) operated by a physical storage processor of the data storage apparatus. The namespace includes only names of objects that are specific to the VSP. The method further includes receiving, by the physical storage processor, a transmission over the network from a host computing device. The transmission is directed to a network address and includes an IO request designating a pathname to a host data object to be written or read. The method still further includes identifying the host data object designated by the IO request by (i) matching the network address to which the transmission is directed with the network address stored for the VSP, to identify the VSP as the recipient of the IO request, and (ii) locating the host data object within the namespace of the VSP using the pathname. The IO request is then processed to complete the requested read or write operation on the identified host data object.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION

Overview

Embodiments of the invention will now be described. It is understood that such embodiments are provided by way of example to illustrate various features and principles of the invention, and that the invention hereof is broader than the specific example embodiments disclosed.

An improved technique involves providing virtual storage processor (VSP) mobility with induced file system format migration by migrating all file systems, i.e., host file systems as well as hidden configuration file systems (file systems which are not directly accessible to hosts and which store control data, personality data, metadata, etc.), of source VSPs to destinations. Such migration may be handled by a migration tool which is within the input/output (I/O) stack but above block-based storage and replication. Accordingly, all data is migrated (i.e., host data as well as configuration data). Furthermore, file system and file characteristics such as file system identifiers and inode numbers assigned to the files of the file systems can be preserved (i.e., identically assigned to the files storing the copied data at the destination) so that mobility as well as migration are transparent to the hosts (e.g., file handles currently in use by the hosts remain usable after migration).

Data Storage System Environment

An improved technique for managing host data in a data storage apparatus provides virtualized storage processors (VSPs) as substantially self-describing and independent constructs.

Figure 1:
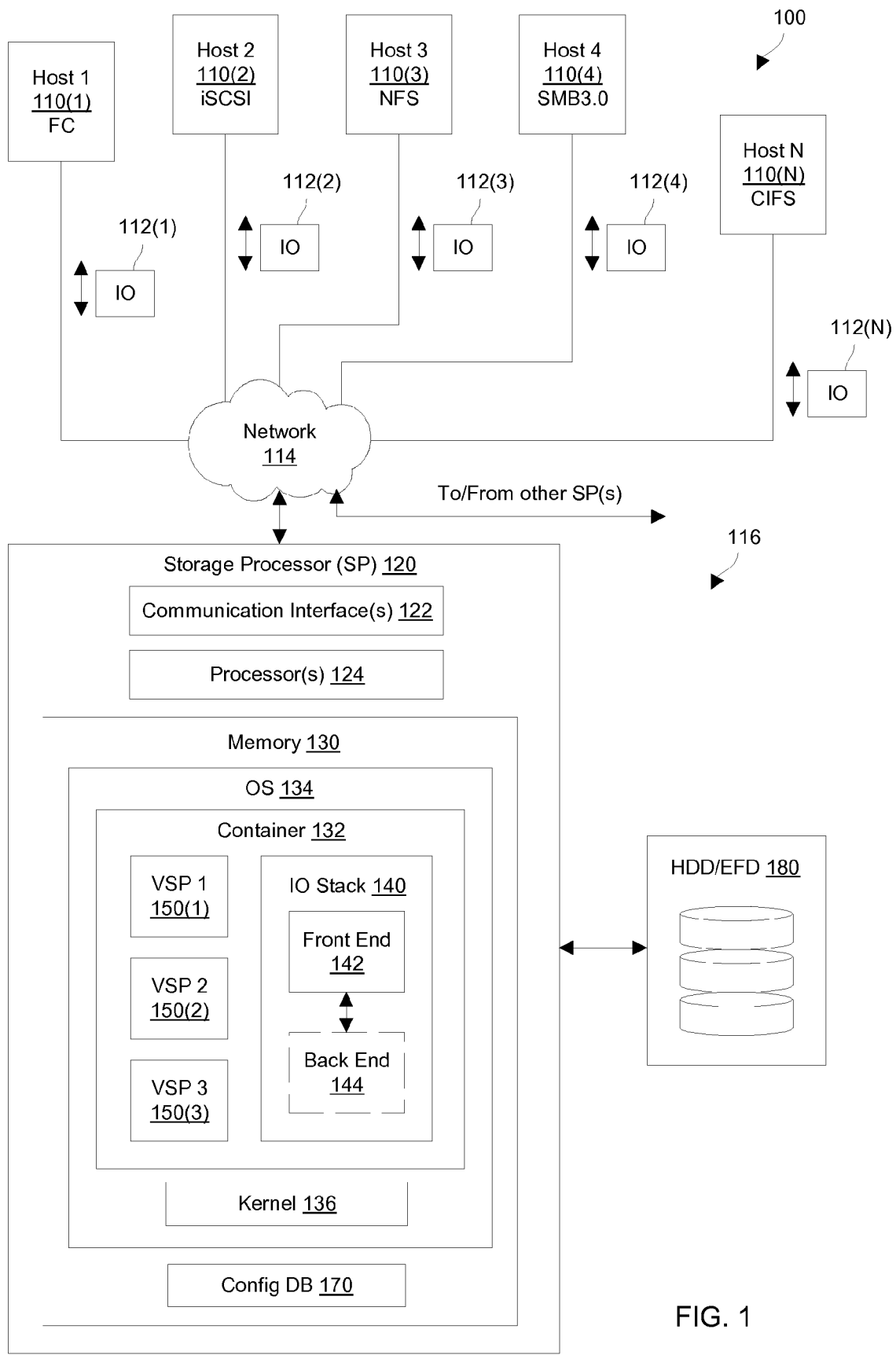
FIG. 1 is a block diagram showing an example data storage apparatus in an environment wherein improved techniques hereof may be practiced, the data storage apparatus including a storage processor having multiple virtualized storage processors (VSPs)

FIG. 1 shows an example environment 100 in which embodiments of the improved technique hereof can be practiced. Here, multiple host computing devices ("hosts") 110(1) through 110(N), access a data storage apparatus 116 over a network 114. The data storage apparatus 116 includes a physical storage processor, or "SP," 120 and storage 180. The storage 180 is provided, for example, in the form of hard disk drives and/or electronic flash drives. Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network, such as, for example, a storage area network (SAN), local area network (LAN), wide area network (WAN), the Internet, some other type of network, and/or any combination thereof. In an example, the hosts 110(1-N) connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) in transmissions from the hosts 110(1-N) according to both block-based and file-based protocols and to respond to such IO requests 112(1-N) by reading or writing the storage 180.

The SP 120 is seen to include one or more communication interfaces 122, control circuitry (e.g., a set of processors 124), and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 are constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 is further seen to include a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can be run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140 and multiple virtualized storage processors (VSPs) 150(1-3). The IO stack 140 provides an execution path for host IOs (e.g., 112(1-N)) and includes a front end 142 and a back end 144. The VSPs 150(1-3) each run within the container 132 and provide a separate context for managing host data. In an example, each VSP manages a respective set of host file systems and/or other data objects and uses servers and settings for communicating over the network 114 with its own individual network identity. Although three VSPs are shown, it is understood that the SP 120 may include as few as one VSP or as many VSPs as the computing resources of the SP 120 and storage resources of the storage 180 allow.

Although the VSPs 150(1-3) each present an independent and distinct identity, it is evident that the VSPs 150(1-3) are not, in this example, implemented as independent virtual machines. Rather, all VSPs 150(1-3) operate in userspace and employ the same kernel 136 of the SP 120. Although it is possible to implement the VSPs 150(1-3) as independent virtual machines (each including a virtualized kernel), it has been observed that VSPs perform faster when the kernel 136 is not virtualized.

Also, it is observed that the VSPs 150(1-3) all run within the container 132, i.e., within a single userspace instance. Again, the arrangement shown reflects a deliberate design choice aimed at optimizing VSP performance. It is understood, though, that alternative implementations could provide different VSPs in different containers, or could be provided without containers at all.

The memory 130 is further seen to store a configuration database 170. The configuration database 170 stores system configuration information, including settings related to the VSPs 150(1-3) and their data objects. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing.

At the front end 142 of the IO stack 140, processing includes associating each of the IO requests 112(1-N) with a particular one of the VSPs 150(1-3). In an example, each VSP stores a network address (e.g., an IP address) in a designated location within its file systems. The front end 142 identifies the network address to which each IO request is directed and matches that address with one of the network addresses stored with the VSPs 150(1-3). The front end 142 thus uses the network address to which each IO request is sent to identify the VSP to which the IO request is directed. Further processing of the IO request is then associated (e.g., tagged) with an identifier of the matching VSP, such that the IO request is processed within a particular VSP context. Any data logging, metrics collection, fault reporting, or messages generated while the IO request is being processed are stored with the associated VSP (e.g., in a file system dedicated to the VSP). Also, any path information provided with the IO request (e.g., to a particular directory and file name) is interpreted within the namespace of the identified VSP.

Processing within the front end 142 may further include caching data provided with any write IOs and mapping host data objects (e.g., host file systems, LUNs, vVols, VMDKs, etc.) to underlying files stored in a set of internal file systems. Host IO requests received for reading and writing both file systems and LUNs are thus converted to reads and writes of respective files. The IO requests then propagate to the back end 144, where commands are executed for reading and/or writing the physical storage 180.

In an example, processing through the IO stack 140 is performed by a set of threads maintained by the SP 120 in a set of thread pools. When an IO request is received, a thread is selected from the set of thread pools. The IO request is tagged with a VSP identifier, and the selected thread runs with the context of the identified VSP. Typically, multiple threads from different thread pools contribute to the processing of each IO request (there are many processing layers). Multiple threads from the thread pools can process multiple IO requests simultaneously, i.e., in parallel, on the data objects of any one VSP or multiple VSPs.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends. In all arrangements, processing through both the front end 142 and back end 144 is preferably tagged with the particular VSP context such that the processing remains VSP-aware.

Figure 2:
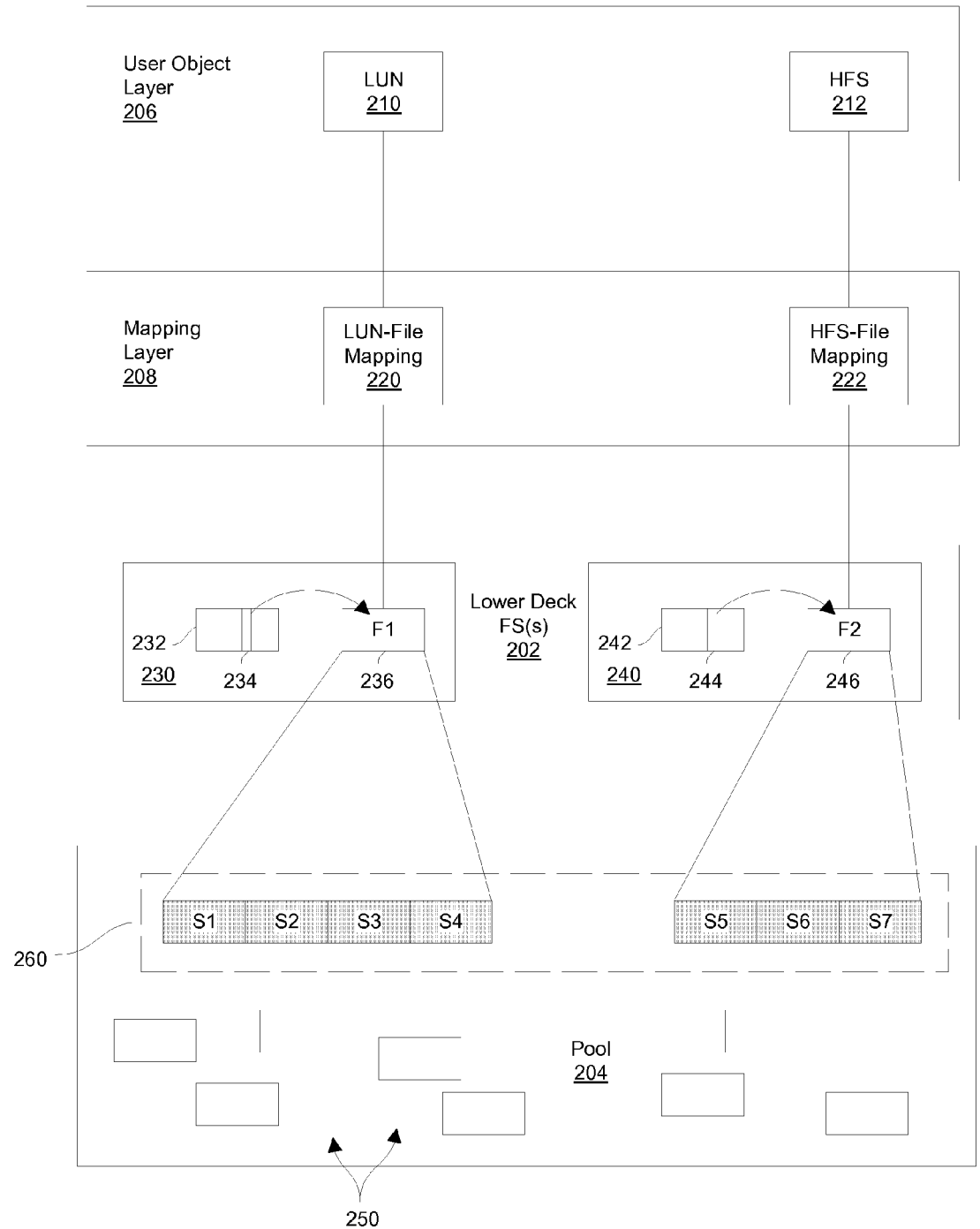
FIG. 2 is a block diagram showing example features of the front end of FIG. 1 in additional detail.

FIG. 2 shows portions of the front end 142 in additional detail. Here, and describing the architecture generally without regard to any particular VSP, it is seen that a set of lower-deck file systems 202 represents LUNs and host file systems in the form of files. Any number of lower-deck file systems 202 may be provided. In one arrangement, a single lower-deck file system may include, as files, any number of LUNs and/or host file systems, as well as their snaps (i.e., point-in-time copies). In another arrangement, a different lower-deck file system is provided for each primary object to be stored, e.g., for each LUN and for each host file system. Additional arrangements provide groups of host file systems and/or groups of LUNs together in a single lower deck file system. The lower-deck file system for any object may include a file storing the object itself, as well as files storing any snaps of the object. Each lower-deck file system 202 has an inode table (e.g., 232, 242), which provides a unique inode for each file stored in the lower-deck file system. The inode table of each lower-deck file system stores properties of each file in the respective lower-deck file system, such as owner-ship and block locations at which the file's data are stored. Lower-deck file systems are built upon storage elements managed by a storage pool 204.

The storage pool 204 organizes elements of the storage 180 in the form of slices. A "slice" is an increment of storage space, such as 256 MB in size, which is obtained from the storage 180. The pool 204 may allocate slices to lower-deck file systems 202 for use in storing their files. The pool 204 may also deallocate slices from lower-deck file systems 202 if the storage provided by the slices is no longer required. In an example, the storage pool 204 creates slices by accessing RAID groups formed from the storage 180, dividing the RAID groups into FLUs (Flare LUNs), and further dividing the FLU's into slices.

Continuing with reference to the example shown in FIG. 2, a user object layer 206 includes a representation of a LUN 210 and of an HFS (host file system) 212, and a mapping layer 208 includes a LUN-to-file mapping 220 and an HFS-to-file mapping 222. The LUN-to-file mapping 220 maps the LUN 210 to a first file F1 (236), and the HFS-to-file mapping 222 maps the HFS 212 to a second file F2 (246). Through the LUN-to-file mapping 220, any set of blocks identified in the LUN 210 by a host IO request is mapped to a corresponding set of blocks within the first file 236. Similarly, through the HFS-to-file mapping 222, any file or directory of the HFS 212 is mapped to a corresponding set of blocks within the second file 246. The HFS 212 is also referred to herein as an "upper-deck file system," which is distinguished from the lower-deck file systems 202, which are for internal use.

In this example, a first lower-deck file system 230 includes the first file 236 and a second lower-deck file system 240 includes the second file 246. Each of the lower-deck file systems 230 and 240 includes an inode table (232 and 242, respectively). The inode tables 232 and 242 provide information about files in respective lower-deck file systems in the form of inodes. For example, the inode table 232 of the first lower-deck file system 230 includes an inode 234, which provides file-specific information about the first file 236. Similarly, the inode table 242 of the second lower-deck file system 240 includes an inode 244, which provides file-specific information about the second file 246. The information stored in each inode includes location information (e.g., block locations) where the respective file is stored, and may thus be accessed as metadata to identify the locations of the files 236 and 246 in the storage 180.

Although a single file is shown for each of the lower-deck file systems 230 and 240, it is understood that each of the lower-deck file systems 230 and 240 may include any number of files, each with its own entry in the respective inode table. In one example, each lower-deck file system stores not only the file F1 or F2 for the LUN 210 or HFS 212, but also snaps of those objects. For instance, the first lower-deck file system 230 stores the first file 236 along with a different file for every snap of the LUN 210. Similarly, the second lower-deck file system 240 stores the second file 246 along with a different file for every snap of the HFS 212.

As shown, a set of slices 260 is allocated by the storage pool 204 for storing the first file 236 and the second file 246. In the example shown, slices S1 through S4 are used for storing the first file 236, and slices S5 through S7 are used for storing the second file 246. The data that make up the LUN 210 are thus stored in the slices S1 through S4, whereas the data that make up the HFS 212 are stored in the slices S5 through S7.

In some examples, each of the lower-deck file systems 230 and 240 is associated with a respective volume, such as a sparse LUN. Sparse LUNs provide an additional layer of mapping between the lower-deck file systems 202 and the pool 204 and allow the lower-deck file systems to operate as file systems normally do, by accessing underlying volumes. Additional details about sparse LUNs and their relation to lower-deck file systems may be found in U.S. Pat. No. 7,631,155, which is hereby incorporated by reference in its entirety. The incorporated patent uses the term "container file system" to refer to a construct similar to the lower-deck file system disclosed herein.

Although the example of FIG. 2 shows storage of a LUN 210 and a host file system 212 in respective lower-deck file systems 230 and 240, it is understood that other data objects may be stored in one or more lower-deck file systems in a similar manner. These may include, for example, file-based vVols, block-based vVols, and VMDKs.

Figure 3:
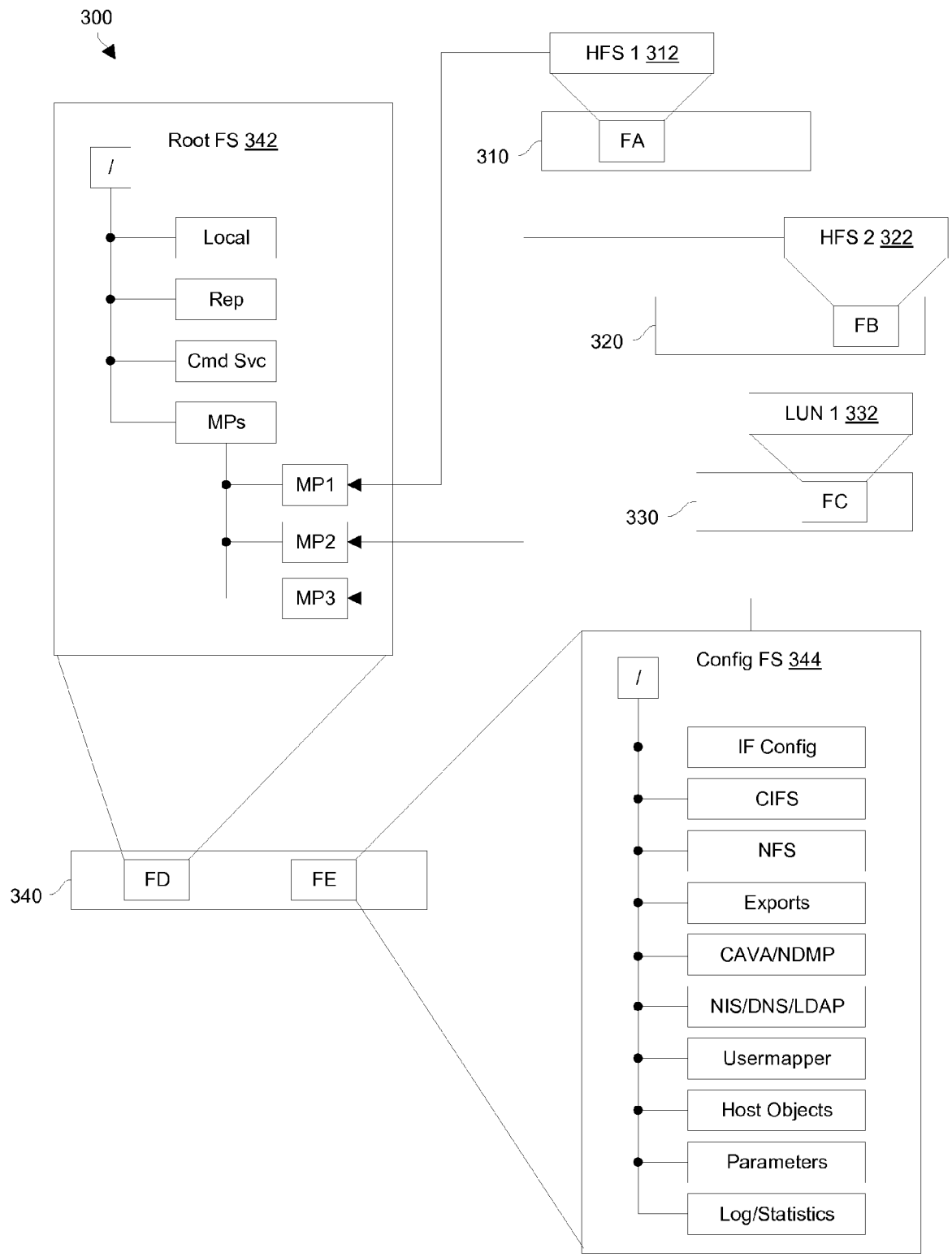
FIG. 3 is a block diagram showing an example set of file systems of a VSP of FIG. 1.

FIG. 3 shows an example set of components of the data storage apparatus 116 that are associated with a particular VSP 300 (i.e., any of the VSPs 150(1-3)). The components shown in FIG. 3 include components that are managed in the context of the VSP 300 and components that form the "personality" of the VSP 300. These components may be referred to herein as "included" within the VSP 300, by which it is meant that the components are associated with the VSP 300 within the data storage apparatus 116 and are not associated with any other VSP. It is thus seen that the VSP 300 "includes" a number of lower-deck file systems hosting various host data objects, as well as internal data objects.

For example, the VSP 300 includes a first lower-deck file system 310 and a second lower-deck file system 320. The first lower-deck file system 310 includes a file FA, which provides a file representation of a first host file system 312. Similarly, the second lower-deck file system 320 includes a file FB, which provides a file representation of a second host file system 322. The host file systems 312 and 322 are upper-deck file systems, which may be made available to hosts 110(1-N) for storing file-based host data. HFS-to-file mappings, like the HFS-to-file mapping 222, are understood to be present (although not shown in FIG. 3) for expressing the files FA and FB in the form of upper-deck file systems. Although only two host file systems 312 and 322 are shown, it is understood that the VSP 300 may include any number of host file systems. In an example, a different lower-deck file system is provided for each host file system. The lower-deck file system stores the file representation of the host file system, and, if snaps are turned on, any snaps of the host file system. In a similar manner to that described in connection with FIG. 2, each of the lower-deck file systems 310 and 320 includes a respective inode table, allowing the files FA and FB and their snaps to be indexed within the respective lower-deck file systems and accessed within the storage 180.

In some examples, the VSP 300 also includes one or more lower-deck file systems for storing file representations of LUNs. For example, a lower-deck file system 330 stores a file FC, which provides a file representation of a LUN 332. A LUN-to-file mapping (not shown but similar to the mapping 320) expresses the file FC in the form of a LUN, which may be made available to hosts 110(1-N) for storing block-based host data. In an example, the lower-deck file system 330 stores not only the file FC, but also snaps thereof, and includes an inode table in essentially the manner described above.

The VSP 300 further also includes a lower-deck file system 340. In an example, the lower-deck file system 340 stores file representations FD and FE of two internal file systems of the VSP 300—a root file system 342 and a configuration file system 344. In an alternative arrangement, the files FD and FE are provided in different lower-deck file systems. In an example, the lower-deck file system 340 also stores snaps of the files FD and FE, and files are accessed within the lower-deck file system 340 via file system-to-file mappings and using an inode table, substantially as described above.

In an example, the root file system 342 has a root directory, designated with the slash ("/"), and sub-directories as indicated. Any number of sub-directories may be provided within the root file system in any suitable arrangement with any suitable file structure; the example shown is merely illustrative. As indicated, one sub-directory ("Local") stores, for example, within constituent files, information about the local environment of the SP, such as local IP sub-net information, geographical location, and so forth. Another sub-directory ("Rep") stores replication information, such as information related to any ongoing replication sessions. Another sub-directory ("Cmd Svc") stores command service information, and yet another sub-directory ("MPs") stores mount points.

In the example shown, the directory "MPs" of the root file system 342 provides mount points (e.g., directories) on which data objects (e.g., file systems and/or LUNs) are mounted. For example, the host file systems 312 and 322 are respectively mounted on mount points MP1 and MP2, the LUN 332 is mounted on the mount point MP3, and the configuration file system 344 is mounted on the mount point MP4. In an example, establishment of the mount points MP1-MP4 and execution of the mounting operations for mounting the file systems 312, 322, 344 and the LUN 332 onto the mount points MP1-MP4 are provided in a batch file stored in the configuration file system 344 (e.g., in Host Objects).

The root file system 342 has a namespace, which includes the names of the root directory, sub-directories, and files that belong to the root file system 342. The file systems 312, 322, and 344 also each have respective namespaces. The act of mounting the file systems 312, 322, and 344 onto the mount points MP1, MP2, and MP4 of the root file system 342 serves to join the namespace of each of the file systems 312, 322, and 344 with the namespace of the root file system 342, to form a single namespace that encompasses all the file systems 312, 322, 342, and 344. This namespace is specific to the VSP 300 and is independent of namespaces of any other VSPs. Although the LUN 332 is a block-based host object that does not itself have a namespace, it is nevertheless part of the namespace of the VSP 300 and is accessible using a path within the namespace of the VSP 300.

Also, it is understood that the root file systems 342 of the VSPs 150(1-n) are separate and distinct from any root file system of the physical SP 120. Thus, if the SP 120 has its own root file system, that root file system is separate from the root file systems 342 of the VSPs and does not share its namespace with the namespace of any of the root file systems 342 of the VSPs.

Although the VSP 300 is seen to include file systems and LUNs, other host objects may be included, as well. These include, for example, file-based vVols, block-based vVols, and VMDKs. Such host objects may be provided as file representations in lower-deck file systems and mounted to mount points of the root file system 342.

As its name suggests, the configuration file system 344 stores configuration settings for the VSP 300. These settings include settings for establishing the "personality" of the VSP 300, i.e., the manner in which the VSP 300 interacts over the network 114. Although the configuration file system 344 is shown with a particular directory structure, it is understood that any suitable directory structure can be used. In an example, the configuration file system 344 stores the following elements:

IF ConFIG. Interface configuration settings of any network interface used for processing IO requests and tagged with a context of the VSP 300. IF Config includes the IP address of the VSP, as well as related network information, such as sub-masks and related IP information.

CIFS. Configuration settings and names of one or more CIFS servers used in the context of the VSP 300. The CIFS servers manage IO requests provided in the CIFS protocol. By including the CIFS configuration within the configuration file system 344, the CIFS configuration becomes part of the VSP 300 itself and remains with the VSP 300 even as the VSP 300 is moved from one SP to another SP. This per-VSP configuration of CIFS also permits each VSP to have its own customized CIFS settings, which may be different from the settings of CIFS servers used by other VSPs.

NFS. Configuration settings and names of one or more NFS servers used in the context of the VSP 300. The NFS servers manage IO requests provided in the NFS protocol. By including the NFS configuration within the configuration file system 344, the NFS configuration becomes part of the VSP 300 itself and remains with the VSP 300 even as the VSP 300 is moved from one SP to another SP. This per-VSP configuration of NFS also permits each VSP to have its own customized NFS settings, which may be different from the settings of NFS servers used by other VSPs.

Exports. NFS exports, CIFS shares, and the like for all supported protocols. For security and management of host access, users are typically given access only to specified resources mounted to the root file system 342, e.g., host file systems, sub-directories of those file systems, and/or particular LUNs. Access to these resources is provided by performing explicit export/share operations, which expose entry points to the resources for host access. In an example, these export/share operations are included within one or more batch files, which may be executed when the VSP 300 is started. Exports are typically VSP-specific, and depend upon the particular data being hosted and the access required.

CAVA/NDMP: CAVA (Celerra Anti-Virus Agent) configuration file, including location of external server for performing virus checking operations. NDMP (Network Data Management Protocol) provides backup configuration information. CAVA and NDMP settings are configurable on a per-VSP basis.

NIS/DNS/LDAP: Local configurations and locations of external servers for providing resolution of IP addresses. NIS (Network Information Service), DNS (Directory Name System), and LDAP (Lightweight Directory Access Protocol) settings are configurable on a per-VSP basis. The DNS configuration stores local host name and domain name of the VSP 300, as well as the location of a DNS server for resolving host names.

Host Objects: Identifiers for all host file systems (e.g., 312 and 322), LUNs (e.g., LUN 332), and other host objects included within the VSP 300. Host objects may also include batch files and/or lists of instructions for establishing mount points in the root file system 342 and for mounting the host file system(s) and LUN(s) to the mount points.

Parameters: Low-level settings (e.g., registry settings) for configuring VSP 300. These include cache settings and settings for specifying a maximum number of threads running on the SP 120 that may be used to service IO requests within the context of the VSP 300. Parameters are configurable on a per-VSP basis.

Statistics: Metrics, log files, and other information pertaining to activities within the context of the VSP 300. Statistics are updated as they accumulate.

Many configuration settings are established at startup of the VSP 300. Some configuration settings are updated as the VSP 300 is operated. The configuration file system 344 preferably does not store host data.

Although FIG. 3 has been shown and described with reference to a particular VSP 300, it is understood that all of the VSPs 150(1-3) may include a root file system, a configuration file system, and at least one host file system or LUN, substantially as shown. Particular host objects and configuration settings differ, however, from one VSP to another.

By storing the configuration settings of VSPs within the file systems of the VSPs themselves and providing a unique namespace for each VSP, VSPs are made to be highly independent, both of other VSPs and of the particular SPs on which they are provided. For example, moving a VSP from one SP to another involves copying its lower-deck file systems (or some subset thereof) from a source SP to a target SP, starting the VSP's servers on the target SP in accordance with the configuration settings, and resuming operation on the target SP. As the paths for accessing data objects on VSPs are not rooted to the SPs on which they are run, hosts may often continue to access migrated VSPs using the same instructions as were used prior to moving the VSPs.

Figure 4:
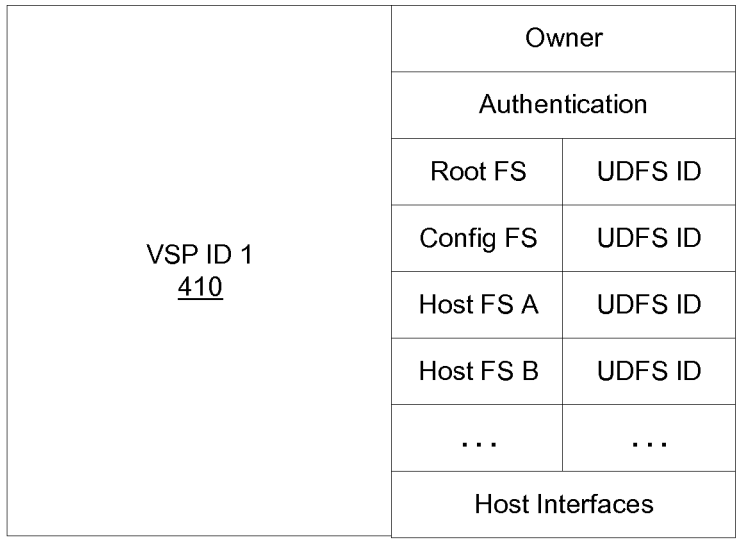
FIG. 4 is a table showing an example set of records stored in a configuration database that defines a VSP that can be run on the storage processor of FIG. 1.

FIG. 4 shows an example record 400 of the configuration database 170, which are used to define a particular VSP having a VSP identifier (ID) 410. The VSP ID 410 may identify one of the VSPs 150(1-3) or some other VSP of the data storage apparatus 116. The record 400 specifies, for example, an owning SP (physical storage processor), authentication, and identifiers of the data objects associated with the listed VSP. The data object identifiers include identifiers of the root file system, configuration file system, and various host file systems (or other host objects) that may be accessed in the context of the listed VSP. The record 400 may also identify the lower-deck file system used to store each data object. The record 400 may further specify host interfaces that specify IO protocols that the listed VSP is equipped to handle.

Although FIG. 4 shows only a single record 400 for a single VSP, it is understood that the configuration database 170 may store records, like the record 400, for any number of VSPs, including all VSPs of the data storage apparatus 116. During start-up of the data storage apparatus 116, or at some other time, a computing device of the data storage apparatus 116 reads the configuration database 170 and launches a particular VSP or a group of VSPs on the identified SPs. As a VSP is starting, the SP that owns the VSP reads the configuration settings of the configuration file system 344 to configure the various servers of the VSP and to initialize its communication protocols. The VSP may then be operated on the identified SP, i.e., the SP may then be operated with the particular VSP's context.

It is understood that VSPs 150(1-3) operate in connection with the front end 142 of the IO stack 140. The VSPs 150(1-3) thus remain co-located with their respective front ends 142 in modular and gateway arrangements.

Figure 5A:
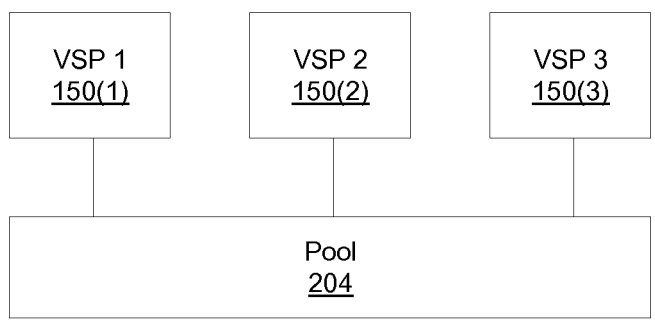
FIGS. 5A and 5B are block diagrams showing example arrangements of virtualized storage processors.
Figure 5B:
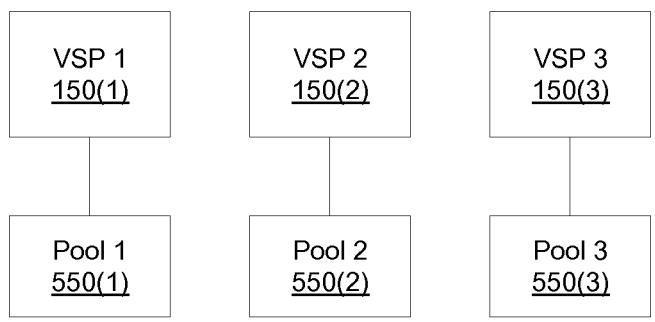

FIGS. 5A and 5B show two different example arrangements of VSPs. In FIG. 5A, the VSPs 150(1-3) access the storage pool 204. Thus, the lower-deck file systems of the VSPs 150(1-3) all derive the slices needed to store their underlying file systems and other data objects from the pool 204. In FIG. 5B, multiple storage pools 550(1-3) are provided, one for each of the VSPs 150(1-3), respectively. Providing different pools for respective VSPs promotes data isolation among the VSPs, and may be better suited for applications involving multiple tenants in which each tenant's data must be kept separate from the data of other tenants.

Figure 6:
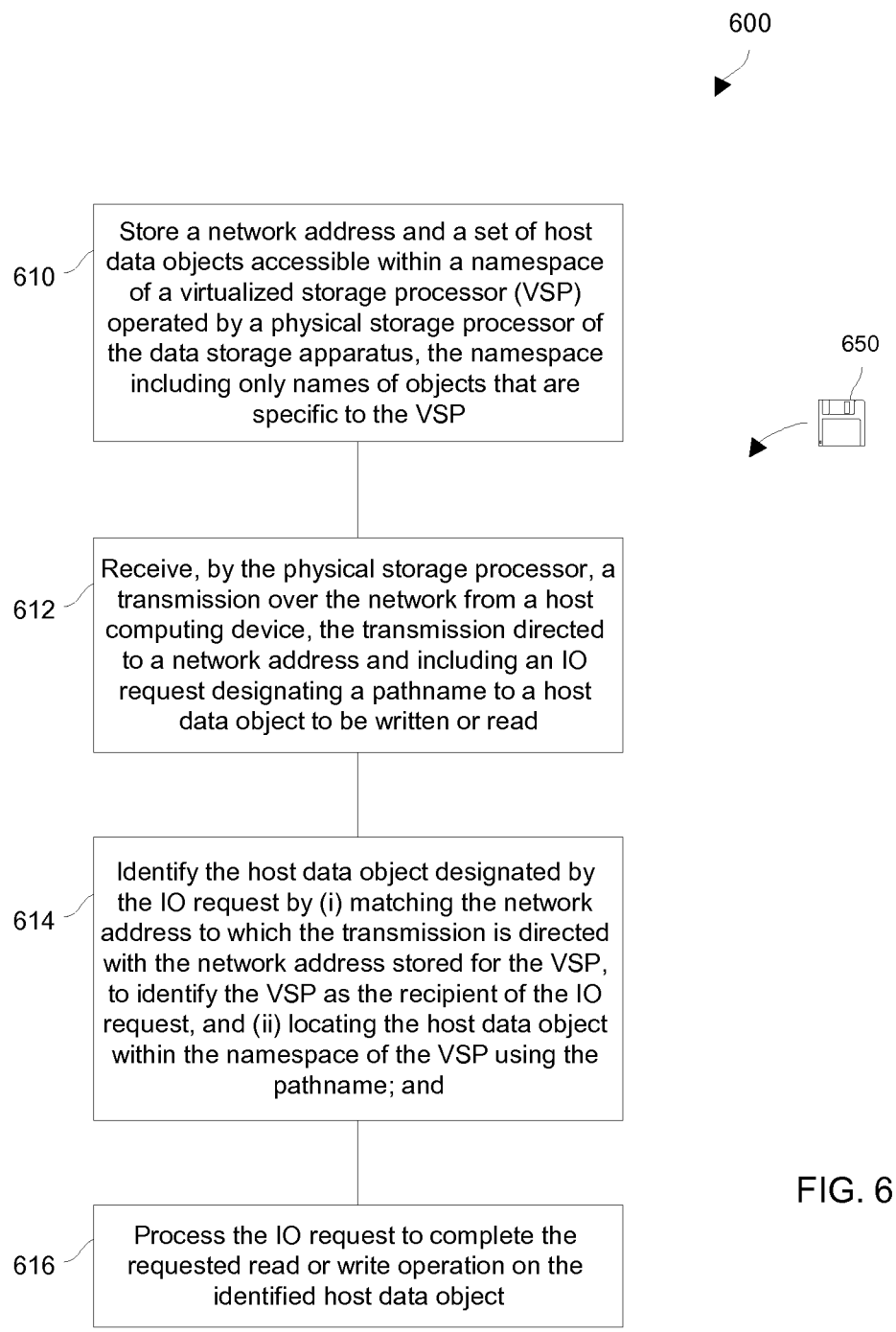
FIG. 6 is a flowchart showing an example process for managing host data using a VSP.

FIG. 6 shows an example method 600 for managing host data on a data storage apparatus connected to a network. The method 600 that may be carried out in connection with the data storage apparatus 116. The method 600 is typically performed by the software constructs, described in connection with FIGS. 1-3, which reside in the memory 130 of the storage processor 120 and are run by the set of processors 124. The various acts of the method 600 may be ordered in any suitable way. Accordingly, embodiments may be constructed in which acts are performed in orders different from those illustrated, which may include performing some acts simultaneously, even though the acts are shown as sequential in the illustrated embodiments.

At step 610, a network address and a set of host data objects are stored in a data storage apparatus. The set of host data objects are accessible within a namespace of a virtualized storage processor (VSP) operated by a physical storage processor of the data storage apparatus. The namespace includes only names of objects that are specific to the VSP. For example, an IP address of the VSP 300 is stored in a file of a directory of the configuration file system 344. The VSP 300 runs on the SP 120 of the data storage apparatus 116. A set of host objects, including host file systems 312 and 322, and LUN 332, are also stored in the data storage apparatus 116. These host objects are made accessible within the namespace of the VSP 300 by mounting these data objects to mount points MP1-MP4 within the root file system 342 and thus merging their namespaces with that of the root file system 342. The resulting merged namespace includes only names of objects that are specific to the VSP 300.

At step 612, a transmission is received by the physical storage processor over the network from a host computing device. The transmission is directed to a network address and includes an IO request designating a pathname to a host data object to be written or read. For example, the SP 120 receives a transmission over the network 114 from one of the hosts 110(1-N). The transmission is directed to a particular IP address and includes an IO request (e.g., one of 112(1-N)). The IO request designates a pathname to a host data object to be written or read. The pathname may point to any of the host file systems 312 or 322, to the LUN 332, or to any file or offset range accessible through the host file systems 312 or 322 or the LUN 332. The pathname may also point to a vVol or VMDK, for example, or to any other object which is part of the namespace of the VSP 300.

At step 614, the host data object designated by the IO request is identified by (i) matching the network address to which the transmission is directed with the network address stored for the VSP, to identify the VSP as the recipient of the IO request, and (ii) locating the host data object within the namespace of the VSP using the pathname. For example, each of the VSPs 150(1-3) stores an IP address in its configuration file system 344. When an IO request is received, an interface running within the front end 142 of the IO stack 140 checks the IP address to which the IO request is directed and matches that IP address with one of the IP addresses stored for the VSPs 150(1-3). The VSP whose IP address matches the IP address to which the IO request is directed is identified as the recipient of the IO request. The IO request arrives to the SP 120 with a pathname to the host data object to be accessed. The front end 142 looks up the designated pathname within the identified VSP to identify the particular data object to which the IO request is directed.

At step 616, the IO request is processed to complete the requested read or write operation on the identified host data object. For example, the front end 142 and the back end 144 process the IO request to perform an actual read or write to the designated host data object on the storage 180.

An improved technique has been described for managing host data in a data storage apparatus. The technique provides virtualized storage processors (VSPs) as substantially self-describing and independent entities. Each VSP has its own namespace, which is independent of the namespace of any other VSP and independent of the namespace of the SP's root file system. Each VSP also has its own network address. Hosts may thus access VSPs directly, without having to include path information relative to the root of the SP on which the VSP is operated. VSPs can thus be moved from one physical SP to another with little or no disruption to hosts, which may continue to access the VSPs on the new SPs using the same paths as were used when the VSPs were running on the original SPs.

As used throughout this document, the words "comprising," "including," and "having" are intended to set forth certain items, steps, elements, or aspects in an open-ended fashion. Also, and unless explicitly indicated to the contrary, the word "set" as used herein indicates one or more of something. Although certain embodiments are disclosed herein, it is understood that these are provided by way of example only and the invention is not limited to these particular embodiments.

Having described certain embodiments, numerous alternative embodiments or variations can be made. For example, embodiments have been shown and described in which host file systems, LUNs, vVols, VMDKs, and the like are provided in the form of files of underlying lower-deck file systems. Although this arrangement provides advantages for simplifying management of VSPs and for unifying block-based and file-based operations, the use of lower-deck file systems is merely an example. Indeed, host file systems, LUNs, vVols, VMDKs, and the like may be provided for VSPs in any suitable way.

Also, although the VSPs 150(1-3) are shown and described as userspace constructs that run within the container 132, this is also merely an example. Alternatively, different VSPs may be provided in separate virtual machines running on the SP 120. For example, the SP 120 is equipped with a hypervisor and a virtual memory manager, and each VSP runs in a virtual machine having a virtualized operating system.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 650 in FIG. 6). Multiple computer-readable media may be used. The medium (or media) may be encoded with instructions which, when executed on one or more computers or other processors, implement the various methods described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not. Those skilled in the art will therefore understand that various changes in form and detail may be made to the embodiments disclosed herein without departing from the scope of the disclosure.

Details of VSP Mobility with Concurrent File System Format Migration FIGS. 7 through 10 show details of a VSP mobility process in which there is induced file system format migration. As will be explained in further detail shortly, the process generally occurs in three parts, i.e., a primary copying phase, a compatibility mode phase, and a commitment phase. Such a process may be performed by a data storage system 800 when a user enters, into a user interface, a VSP move command to move a VSP from a source location 802(S) to a destination location 802(D). Although certain data storage apparatus details are purposefully omitted from FIGS. 7 through 10 for simplicity, it should be understood that the data storage system 800 includes various data storage hardware components (also see the data storage apparatus 116 in FIG. 1).

It should be understood that the source location 802(S) and the destination location 802(D) may reside in the same data storage array such as in separate storage pools 204(1), 204(2) (e.g., among storage drives in the same room, on the same set of racks, in the same enclosure or cabinet, etc.), also see the storage pool 204 in FIG. 2 and the separate storage pools 550 in FIG. 5B. Alternatively, the source location 802(S) and the destination location 802(D) may reside in different storage arrays (e.g., on different data storage apparatus 116, in different rooms, campuses, cities, etc.).

It should be further understood that the user may enter commands into the data storage system 800 via a local control console or terminal (e.g., a user interface) or remotely from a client device. In either situation, the user is able to enter commands effectively to control operation of the data storage system 800, e.g., by simply typing into a command line interface, by operating a pointing device via a specialized graphical user interface (GUI), combinations thereof, and so on.

Figure 7:
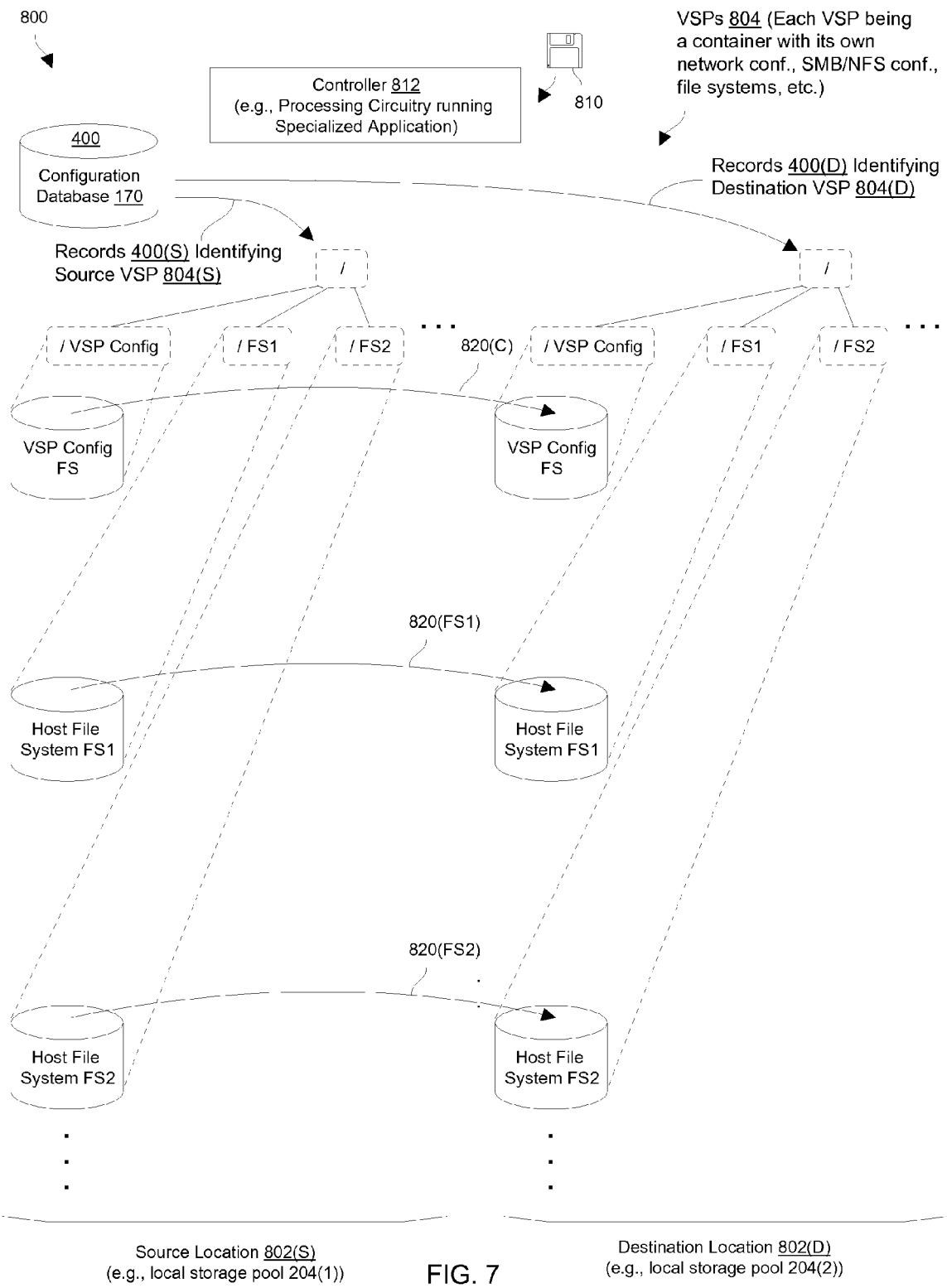
FIG. 7 is a block diagram showing general details of moving a VSP from a source location to a destination location with induced file system format migration.

Initially and by way of example, suppose that the user intends to move a source VSP 804(S) located in storage pool 204(1) to a destination VSP 804(D) located in storage pool 204(2) on the same data storage array or apparatus 116 (FIGS. 1 and 7). In this situation, suppose that the configuration database 170 of the data storage system 800 already includes a particular set of database records 400(S) for the source VSP 804(S) (FIG. 7). Further suppose that the source VSP 804(S) has been operating for some period time to store host data on behalf of one or more hosts 110 (also see FIG. 1). To this end, the particular set of database records 400(S) defines, for the source VSP 804(S), a root file system "/" and appropriate mount points on which to mount other file systems. The particular set of database records 400(S) further defines other file systems which are mounted to the root file system of the source VSP 804(S). In this example and as shown in FIG. 7 (see dashed lines), a VSP configuration file system "/VSP Config" and two host (or user) file systems "/FS1", "/FS2" are mounted to the root file system of the source VSP 804(S). The particular set of database records 400(S) may further define other information as well such as replication sessions which are currently ongoing and which involve these file systems (hereinafter referred to as the source file systems of the source VSP 804(S)).

As described earlier in connection with FIG. 3, the VSP configuration file system "/VSP Config" includes VSP configuration data which defines an operating environment for the source VSP 804(S) (e.g., a network address, CIFS settings, NFS settings, other VSP "personality" information, and so on). Accordingly, the personality or identity of the source VSP 804(S) is defined by the VSP configuration data in the VSP configuration file system.

The host file systems "/FS1", "/FS2" include host data provided by host applications running on the hosts 110 (FIG. 1). Since the VSP configuration file system "/VSP Config" defines the operating environment for the host file systems "/FS1", "/FS2", accessibility of any replicas of the host file systems "/FS1", "/FS2" requires presence of the VSP configuration file system "/VSP Config".

Now, suppose that the user (e.g., an administrator of the data storage system 800) is ready to begin VSP movement. To direct the data storage apparatus 116 to move the source VSP 804(S), the user enters a move command into the data storage system 800. If the user does not specify that he or she wishes to induce file system format migration, the data storage system 800 responds by moving the source VSP 804(S) without file system format migration. A suitable technique for performing such movement uses replication and can be found in U.S. patent application Ser. No. 13/837,053, entitled "PROVIDING MOBILITY TO VIRTUAL STORAGE PROCESSORS", the teachings of which are hereby incorporated by reference in their entirety.

However, suppose that the user specifies that he or she wishes to induce file system format migration when moving the source VSP 804(S). To start migration, the user runs a specialized application 810 (e.g., dedicated business logic, an inband migration tool, a script, combinations thereof, etc. also see FIG. 7) to perform VSP mobility with induced file system format migration. That is, the processing circuitry 124 (FIG. 1) of the data storage system 800, when running the specialized application 810 (FIG. 7), forms a specialized controller 812 (FIG. 7) which carries out the movement process.

Along these lines, the user may enter a single move command. A suitable syntax for such a migration command is:

$ nas_move -source src_VSP -destination dest_VSP -fs-_format UFS64 where "nas_move" is the specific move instruction, "-create_all" is an option directing migration of all mounted file systems, "-source src_VSP" is an option identifying the source VSP (i.e., "src_VSP" is the source VSP 804(S)), "-destination dest_VSP" is an option identifying the destination VSP (i.e., "dest_VSP" is the destination location 802(D) or the destination VSP 804(D) to be created), "-fs_format UFS64" is an option identifying the new file system format (e.g., UFS-64) to be used by the destination VSP. It should be understood that, in this example, the source VSP initially uses a file system format (e.g., UFS-32) which is different than that of the destination VSP. Other syntaxes are suitable for use as well. Furthermore, other file system formats can be used in migration, and other options can be included in the migration command as well.

In response to the move command, the controller 812 (i.e., the processing circuitry 124 running the application 810) accesses the configuration database 170 (FIG. 1) to identify which file systems are mounted to the root file system of the source VSP 804(S). In the context of a set of processors executing software, it should be understood that executable code for carrying out VSP movement may reside in the front end 142 of the IO stack 140 (also see FIG. 1).

In this example, the controller 812 sees that there are at least three files systems (i.e., the VSP configuration file system and two host files systems) that are mounted to the root file system of the source VSP 804(S) which is to be migrated. Accordingly, the controller 812 automatically creates a new set of database records 400(D) in the configuration database 170 to define the destination VSP 804(D). Additionally, the controller 812 creates a destination root file system "/" for the destination VSP 804(D) and appropriate mount points on which to mount other file systems. Furthermore, the controller 812 appropriately creates destination file systems (i.e., "/VSP Config", "/FS1", and "/FS2") which use the new file system format (e.g., UFS-64) and mounts the destination file systems to the destination root file system "/" of the destination VSP 804(D). At this point, the destination VSP 804(D) is formed and the new set of database records 400(D) accurately reflect the existence of the destination VSP 804(D). In some arrangements, parts of the root file system "/" of the source VSP 804(S) are copied to the root file system of the destination VSP 804(D) (e.g., files containing local configuration, replication context, etc. are copied).

Next, the controller 812 enters a primary copying phase and copies data from the source file systems to the destination file systems (FIG. 7). Arrow 820(C) in FIG. 7 illustrates copying of the data from "/VSP Config" of the source VSP 804(S) and storing the copied data in "/VSP Config" of the destination VSP 804(D). Similarly, arrow 820(FS1) in FIG. 7 illustrates copying of the data from "/FS1" of the source VSP 804(S) and storing the copied data in "/FS1" of the destination VSP 804(D) Likewise, arrow 820(FS2) in FIG. 7 illustrates copying of the data from "/FS2" of the source VSP 804(S) and storing the copied data in "/FS2" of the destination VSP 804(D). It should be understood that, during this copy activity, the copied data is stored in the new file system format (e.g., UFS-64).

Figure 8:
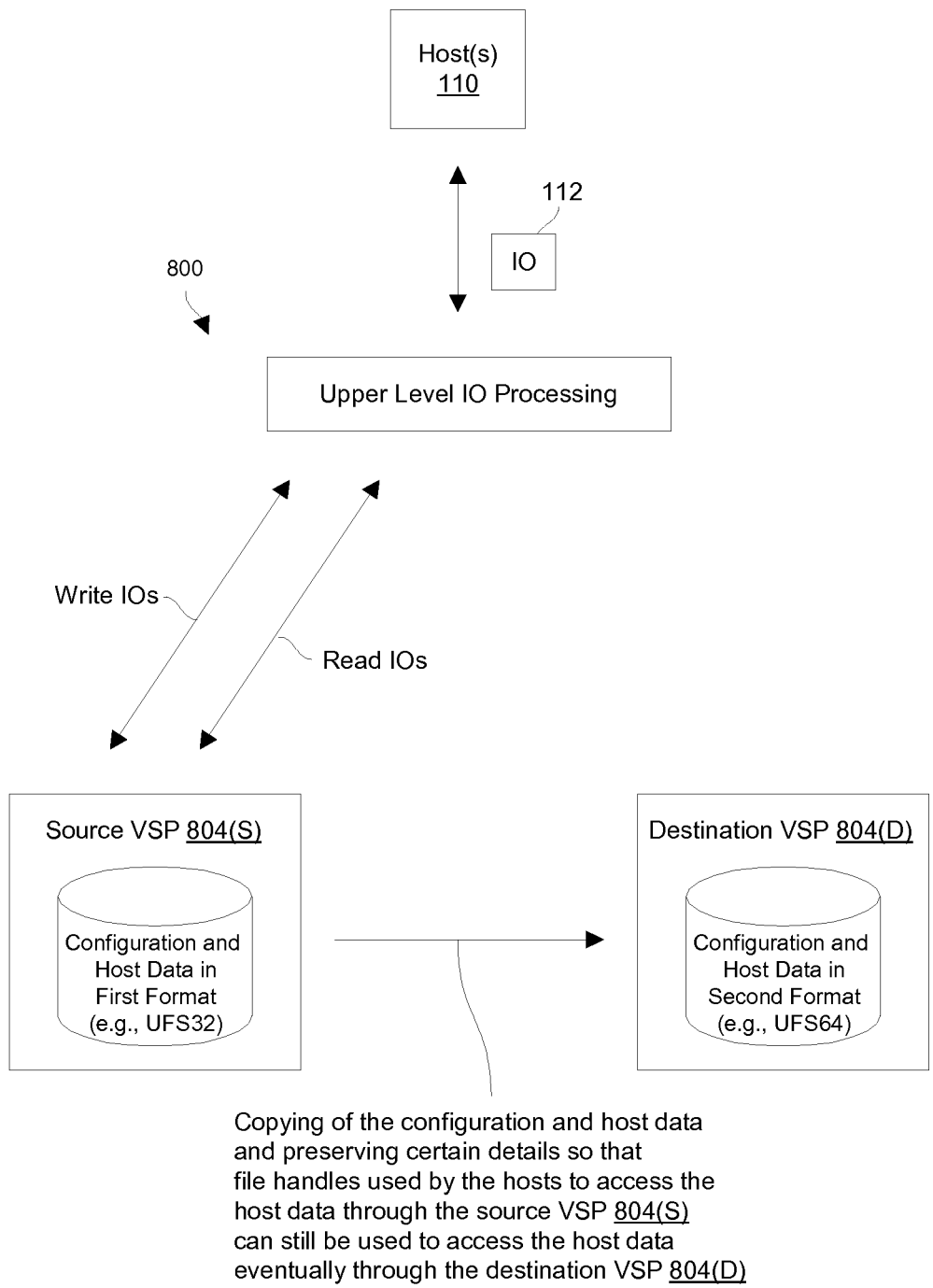
FIG. 8 is a block diagram showing particular operating details during an initial phase.

FIG. 8 shows particular IO processing details during the primary copying phase. In particular, as the controller 812 copies the configuration and host data in the first format from the source location 802(S) to the second format at the destination location 802(D), the controller 812 preserves certain details so that file handles used by the hosts 110 to access host data through the source VSP 804(S) can still be used to access the host data eventually through the destination VSP 804(D). Such preserved details include the file system identifier, file identifier (or inode number) assignments, generation counts (to track reuse of file identifiers), among others. As a result, mobility and format migration can be made fully transparent to the hosts 110 (e.g., there is no need to unmount and remount file systems).

As shown in FIG. 8, during this primary copying phase, all host IOs 112 are serviced through the source VSP 804(S). That is, the hosts 110 send their host IOs 112 to the data storage apparatus 116 (FIG. 1), and the upper level of the IO stack (FIG. 2) steers all host IO requests to the source VSP 804(S).

Figure 9:
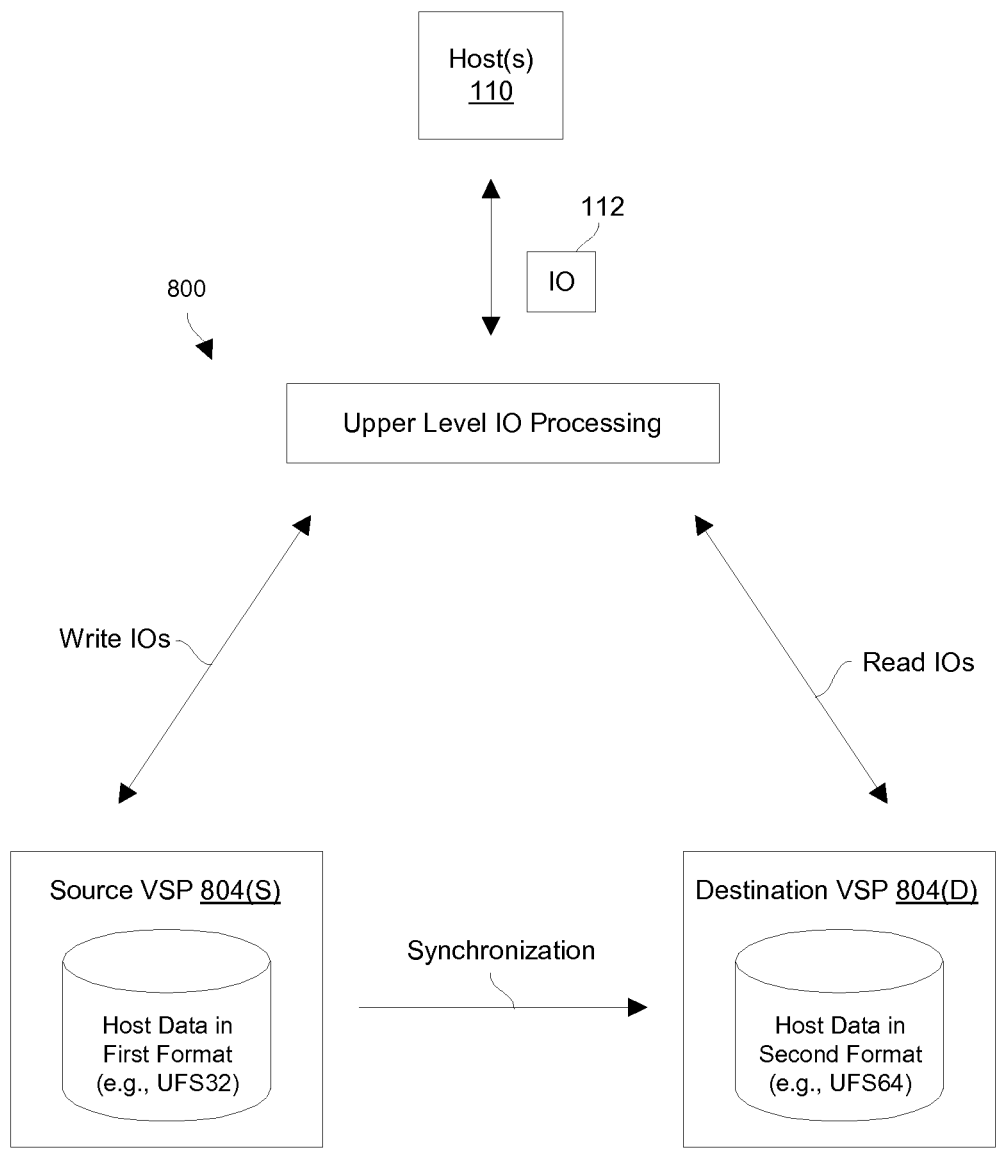
FIG. 9 is a block diagram showing particular operating details during a compatibility mode phase.

FIG. 9 shows a compatibility mode that the data storage apparatus 116 enters once all of the files and file data are copied from the source VSP 804(S) to the destination VSP 804(D). In some arrangements, the controller 812 automatically and transparently transitions from the initial copying mode to the compatibility mode. In other arrangements, the user is prompted for approval before the data storage apparatus 116 switches to the compatibility mode phase. In compatibility mode, the controller 812 continues synchronizing state changes occurring in the source VSP 804(S) to the destination VSP 804(D). For example, if a host 110 writes new host data to the source VSP 804(S), the controller 812 automatically synchs that new host data to the destination VSP 804(D) so that both the source VSP 804(S) and the destination VSP 804(D) contain the same host data, i.e., the same state. Accordingly, VSP movement continues to remain seamless to the hosts 110.

However, as shown in FIG. 9, all host access that do not cause state changes are now directed to the destination VSP 804(D). For example, host read operations are now steered by the upper level of the IO stack to the destination VSP 804(D). Such operation enables the hosts 110 to test out operability of the destination VSP 804(D) before fully committing to the permanent use of the destination VSP 804(D).

In some situations, the user may wish to remain in compatibility mode for just a short period of time, e.g., perhaps the user is anxious to take full advantage of the improvements available from the new file system format. However, it should be understood that the data storage system 800 is capable of continuing to operate in compatibility mode for an extended or indefinite period of time. During this period, the source VSP 804(S) continues to process host write requests (with state synchronization to the destination VSP 806(D)), and the destination VSP 806(D) continues to process non-state changing IOs.

It should be understood that if the user changes his or her mind and wishes to revert back to fully using the source VSP 804(S), the user can enter a rollback command to the data storage apparatus 116. In response to the rollback command, the upper level of the IO stack stops steering certain IOs (e.g., host read requests) to the destination VSP 804(D). Instead, the upper level of the IO stack now steers all IOs to the source VSP 804(S) (FIG. 8) and the VSP movement process is terminated. As a result, the storage consumed by copying the data to the second file system format can be reused for other purposes.

Figure 10:
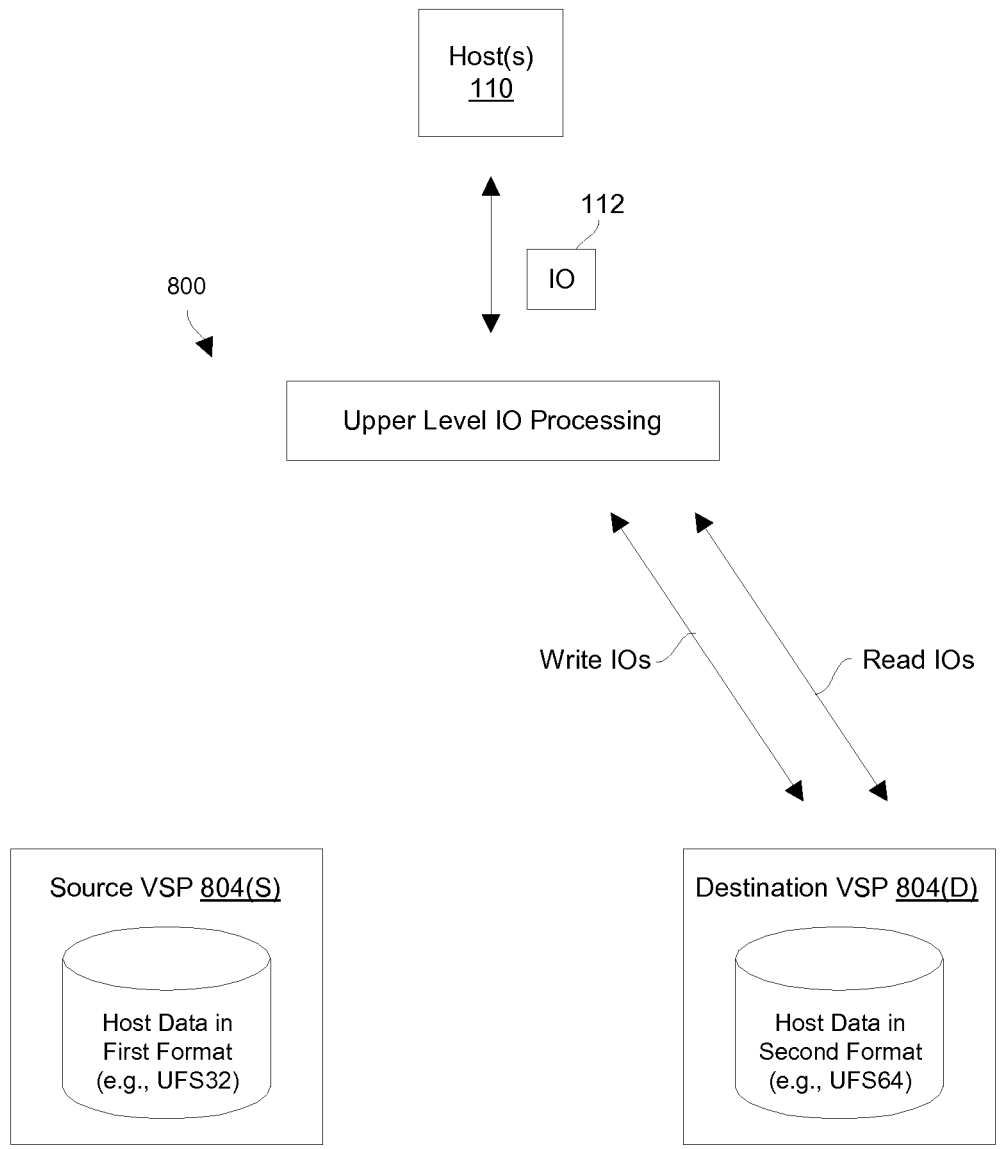
FIG. 10 is a block diagram showing particular operating details once commitment has been made.

FIG. 10 shows the operation of the data storage apparatus 116 once the user fully commits to the destination VSP 804(D) and the new file system format. To reach this commitment phase, the user enters a commit command to the controller 812 (FIG. 7) and, in response to the commit command, the controller 812 updates the configuration database 170 so that all future IOs (e.g., host read requests and host write requests) are processed by the destination VSP 804(D). At this point, all future operations utilize the new file system format (e.g., UFS-64). The data from the source VSP 804(S) can then be deleted and the storage consumed by the data in the first file system format can be reclaimed and reused.

Operations with the hosts 110 continue uninterrupted so that the VSP movement process is perfectly seamless to the hosts 110 (i.e., all file handles continue to work). The advantages of the new file system format can now be fully enjoyed.

Further Details

Figure 11:
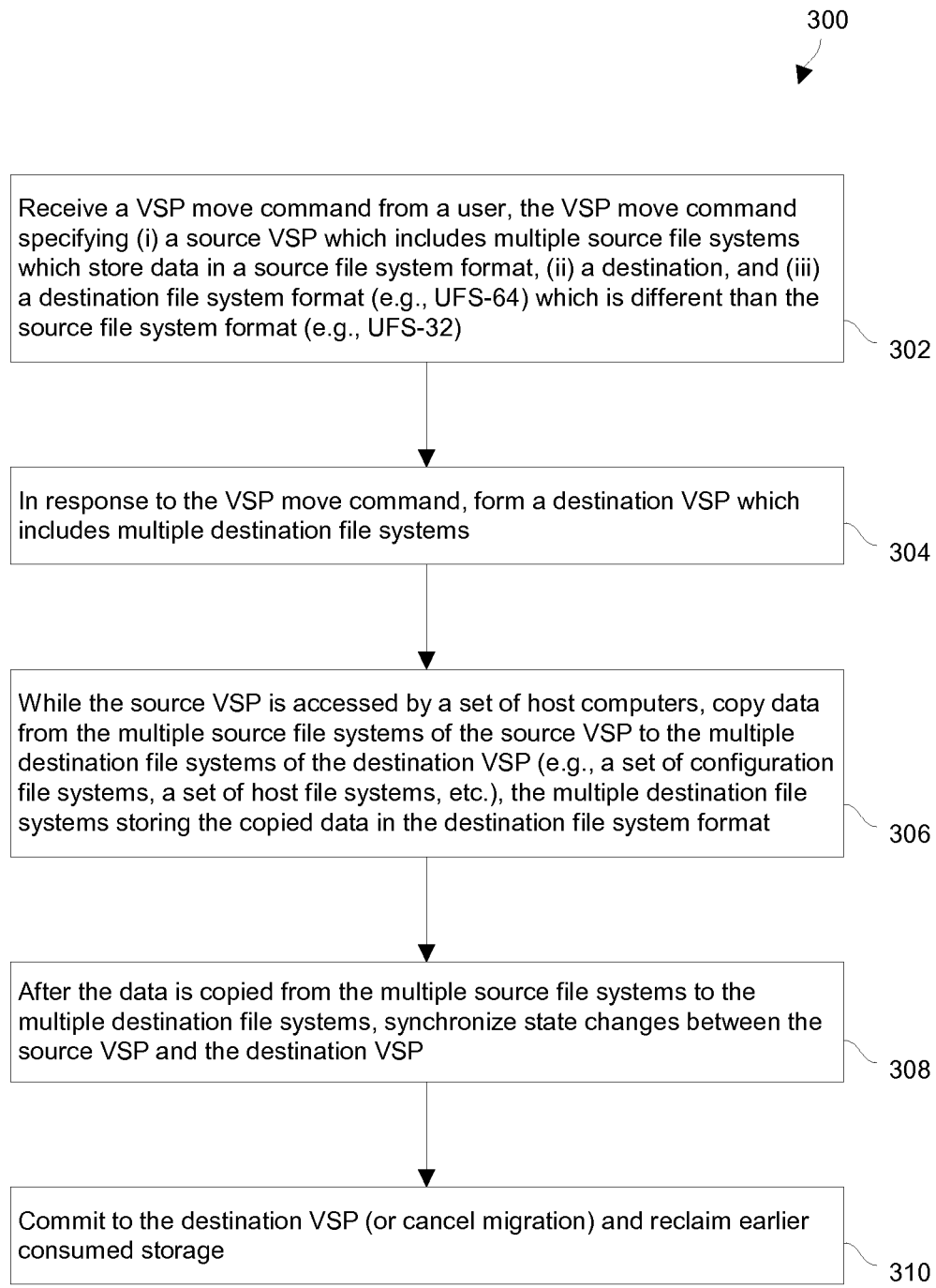
FIG. 11 is a flowchart of a procedure which is performed by circuitry of the data storage apparatus of FIG. 1 when moving a VSP from a source location to a destination location with induced file system format migration.

FIG. 11 is a flowchart of a procedure 300 which is performed by circuitry of the data storage apparatus of FIG. 1 when moving a VSP from a source location to a destination location with induced file system format migration. For example, when moving a VSP from one location to another, the user may specify a new file system format for the VSP at the new location (e.g., migration from UFS-32 format to UFS-64 format).

In step 302, the circuitry receives a VSP move command from a user. As mentioned earlier, the VSP move command specifies (i) a source VSP which includes multiple source file systems which store data in a source file system format, (ii) a destination (or a destination VSP), and (iii) a destination file system format which is different than the source file system format.

In step 304, the circuitry forms, in response to the VSP move command, a destination VSP which includes multiple destination file systems. In particular, the circuitry accesses the configuration database 170 in a manner which is hidden from the hosts 110.

In step 306, while the source VSP 804(S) is accessed by one or more of the hosts 110, the circuitry copies data from the multiple source file systems of the source VSP 804(S) to the multiple destination file systems of the destination VSP 804 (D) and stores the copied data in the destination file system format.

In step 308, after the data is copied from the multiple source file systems to the multiple destination file systems, the circuitry synchronizes state changes between the source VSP and the destination VSP. In particular, any data which is changed at the source VSP is also changed at the destination VSP.

In step 310, the circuitry receives a commit command and commits to using the destination VSP (or a cancellation/rollback command to cancel migration). Once the circuitry commits to the destination VSP, all data accesses are processed by the destination VSP, and the data corresponding to the source VSP can be removed and the storage space can be reused.

As described above, improved techniques involve providing VSP mobility with induced file system format migration by migrating all file systems, i.e., host file systems as well as hidden configuration (i.e., control data, personality data and metadata) file systems of source VSPs to destinations. Such migration may be handled by a migration tool which is within the input/output (I/O) stack, but above block-based storage and replication. Accordingly, all data is migrated (i.e., host data as well as configuration data). Additionally, file characteristics such as the file system identifier, file identifiers (e.g., inode numbers assigned to host files of host file systems) can be preserved (i.e., identically assigned at the destination).

While various embodiments of the present disclosure have been particularly shown and described, it will be understood by those skilled in the art that various changes in form and details may be made therein without departing from the spirit and scope of the present disclosure as defined by the appended claims.

Along these lines, the migration process was described above as being initiated via a user command, and the particular user command was by way of example shown as a command line. Other forms of commands are suitable for use as well such as a series of subcommands and/or parameters entered via a GUI or series of dialog windows.

Moreover, the migration command was described above as being entered directly by a user by way of example only. In other arrangements, the migration command can be entered automatically or indirectly, e.g., via a script, as part of a complex series of commands, from a program as part of an application programming interface (API), and so on.

Additionally, it should be understood VSP movement was described above as occurring between two different storage pools 204 by way of example only. In some arrangements, VSP movement with induced file system format migration is performed within the same storage pool 204.

Furthermore, the VSP mobility was described above as occurring in the same data storage array by way of example only. In other arrangements, VSP mobility induced file system format migration occurs across arrays. In these arrangements, the configuration database 170 of both data storage apparatus 116 are updated during the migration process. Such modifications and enhancements are intended to belong to various embodiments of the disclosure.

What is claimed is:

1. A method of providing virtual storage processor (VSP) mobility and induced file system format migration, the method comprising:

receiving, by processing circuitry, a VSP move command from a user, the VSP move command specifying (i) a source VSP which includes multiple source file systems which store data in a source file system format using block pointers having a first block pointer size defined by the source file system format, (ii) a destination, and (iii) a destination file system format which is different than the source file system format;

in response to the VSP move command, forming, by the processing circuitry, a destination VSP which includes multiple destination file systems;

while the source VSP is accessed by a set of host computers, copying, by the processing circuitry, data from the multiple source file systems of the source VSP to the multiple destination file systems of the destination VSP, the multiple destination file systems storing the copied data in the destination file system format using block pointers having a second block pointer size defined by the destination file system format, the second block pointer size being different than the first block pointer size; and after the data is copied from the multiple source file systems to the multiple destination file systems, synchronizing, by the processing circuitry, state changes between the source VSP and the destination VSP.

2. A method as in claim 1 wherein the source VSP includes (i) a first set of configuration file systems storing source VSP configuration data and (ii) a first set of host file systems storing host data; and wherein forming the destination VSP includes:

providing (i) a second set of configuration file systems to store destination VSP configuration data and (ii) a second set of host file systems to store a copy of the host data, the first and second sets of configuration file systems being transparent to the set of host computers, and the first and second sets of host file systems being visible to the set of host computers.

3. A method as in claim 2 wherein the first set of configuration file systems and the first set of host file systems include existing inode structures to store the data using the block pointers having the first block pointer size defined by the source file system format; and wherein providing the second set of configuration file systems and the second set of host file systems includes:

provisioning the second set of configuration file systems and the second set of host file systems with new inode structures to store the copied data using the block pointers having the second block pointer size defined by the destination file system format.

4. A method as in claim 3 wherein a configuration database holds multiple VSP records corresponding to multiple VSPs; and wherein forming the destination VSP includes:

based on the VSP move command, (i) reading an existing set of entries from the configuration database to identify the first set of configuration file systems and the first set of host file systems of the source VSP, and (ii) creating a new set of entries in the configuration database to define the second set of configuration file systems and the second set of host file systems of the destination VSP, wherein reading the existing set of entries and creating the new set of entries is transparent to the set of host computers.

5. A method as in claim 3 wherein the source VSP resides in a source storage pool of a data storage array; wherein the destination VSP resides in a destination storage pool of the data storage array; and wherein copying the data from the multiple source file systems to the multiple destination file systems includes:

copying the data from the source storage pool and storing the copied data in the destination storage pool of the data storage array.

6. A method as in claim 3 wherein copying the data from the multiple source file systems to the multiple destination file systems while the source VSP is accessed by the set of host computers includes:

processing host input/output (I/O) requests directed to the first set of host file systems of the source VSP using the existing inode structures having the first block pointer size.

7. A method as in claim 6 wherein synchronizing the state changes between the source VSP and the destination VSP includes:

processing further host I/O requests directed to the first set of host file systems of the source VSP using the existing inode structures having the first block pointer size, and copying new data stored in the first set of host file systems of the source VSP, and storing the copied new data in the second set of host file systems of the destination VSP using the new inode structures having the second block pointer size.

8. A method as in claim 6 wherein synchronizing the state changes between the source VSP and the destination VSP includes:

while processing host read requests from the second set of host file systems of the destination VSP using the new inode structures having the second block pointer size, copying new data stored in the first set of host file systems of the source VSP, and storing the copied new data in the second set of host file systems of the destination VSP using the new inode structures having the second block pointer size.

9. A method as in claim 3 wherein associations exist between (i) files of the first set of configuration file systems and the first set of host file systems and (ii) inode numbers of the existing inode structures; wherein provisioning the second set of configuration file systems and the second set of host file systems with new inode structures includes:

identically assigning inode numbers of the new inode structures to files of the second set of configuration file systems and the second set of host file systems to preserve, at the destination VSP, the associations exist between (i) the files of the first set of configuration file systems and the first set of host file systems and (ii) the inode numbers of the existing inode structures.

10. A method as in claim 9 wherein provisioning the second set of configuration file systems and the second set of host file systems with new inode structures further includes:

populating the new inode structures with inode structure attributes from the existing inode structure to maintain file attributes between (i) the files of the first set of configuration file systems and the first set of host file systems of the source VSP and (ii) the files of the second set of configuration file systems and the second set of host file systems of the destination VSP.

11. A method as in claim 3, further comprising:
receiving a VSP rollback command from the user, the VSP rollback command identifying the destination, and
in response to the VSP rollback command, terminating synchronization of the state changes between the source VSP and the destination VSP to rollback to using the source VSP for primary access to the data.

12. A method as in claim 3, further comprising:
receiving a VSP commit command from the user, the VSP commit command identifying the destination, and
in response to the VSP commit command, (i) preventing processing of new host input/output (I/O) requests in the source VSP, (ii) terminating synchronization of the state changes between the source VSP and the destination VSP, and (iii) processing the new host I/O requests in the destination VSP using the new inode structures having the second block pointer size.

13. A method as in claim 1 wherein synchronizing the state changes between the source VSP and the destination VSP includes:

after the data is copied from the multiple source file systems to the multiple destination file systems, transitioning from an initial copying mode to a compatibility mode in which writing of new host data from the set of host computers is performed on both the source VSP and the destination VSP for an extended period of time prior to one of responding to a rollback and a commit command from the user.

14. An electronic apparatus, comprising:
a host interface to communicate with a set of host computers;
memory; and
control circuitry coupled to the host interface and the memory, the memory storing instructions which, when carried out by the control circuitry, cause the control circuitry to:
receive a virtual storage processor (VSP) move command from a user, the VSP move command specifying (i) a source VSP which includes multiple source file systems which store data in a source file system format using block pointers having a first block pointer size defined by the source file system format, (ii) a destination, and (iii) a destination file system format which is different than the source file system format,
in response to the VSP move command, form a destination VSP which includes multiple destination file systems,
while the source VSP is accessed by the set of host computers through the host interface, copy data from the multiple source file systems of the source VSP to the multiple destination file systems of the destination VSP, the multiple destination file systems storing the copied data in the destination file system format using block pointers having a second block pointer size defined by the destination file system format, the second block pointer size being different than the first block pointer size, and
after the data is copied from the multiple source file systems to the multiple destination file systems, synchronize state changes between the source VSP and the destination VSP.

15. An electronic apparatus as in claim 14 wherein the source VSP includes (i) a first set of configuration file systems storing source VSP configuration data and (ii) a first set of host file systems storing host data; and wherein the control circuitry, when forming the destination VSP, is constructed and arranged to:

provide (i) a second set of configuration file systems to store destination VSP configuration data and (ii) a second set of host file systems to store a copy of the host data, the first and second sets of configuration file systems being transparent to the set of host computers, and the first and second sets of host file systems being visible to the set of host computers.

16. An electronic apparatus as in claim 15 wherein the first set of configuration file systems and the first set of host file systems include existing inode structures to store the data using the block pointers having the first block pointer size defined by the source file system format; and wherein the control circuitry, when providing the second set of configuration file systems and the second set of host file systems, is constructed and arranged to:

provision the second set of configuration file systems and the second set of host file systems with new inode structures to store the copied data using the block pointers having the second block pointer size defined by the destination file system format.

17. An electronic apparatus as in claim 16 wherein associations exist between (i) files of the first set of configuration file systems and the first set of host file systems and (ii) inode numbers of the existing inode structures; wherein the control circuitry, when provisioning the second set of configuration file systems and the second set of host file systems with new inode structures, is constructed and arranged to:

identically assign inode numbers of the new inode structures to files of the second set of configuration file systems and the second set of host file systems to preserve, at the destination VSP, the associations exist between (i) the files of the first set of configuration file systems and the first set of host file systems and (ii) the inode numbers of the existing inode structures.

18. A computer program product having a non-transitory computer readable medium which stores a set of instructions to providing virtual storage processor (VSP) mobility and concurrent file system format migration, the set of instructions, when carried out by computerized circuitry, causing the computerized circuitry to perform a method of:

receiving a VSP move command from a user, the VSP move command specifying (i) a source VSP which includes multiple source file systems which store data in a source file system format using block pointers having a first block pointer size defined by the source file system format, (ii) a destination, and (iii) a destination file system format which is different than the source file system format;

in response to the VSP move command, forming a destination VSP which includes multiple destination file systems;

while the source VSP is accessed by a set of host computers, copying data from the multiple source file systems of the source VSP to the multiple destination file systems of the destination VSP, the multiple destination file systems storing the copied data in the destination file system format using block pointers having a second block pointer size defined by the destination file system format, the second block pointer size being different than the first block pointer size; and after the data is copied from the multiple source file systems to the multiple destination file systems, synchronizing state changes between the source VSP and the destination VSP.

19. A computer program product as in claim 18 wherein the source VSP includes (i) a first set of configuration file systems storing source VSP configuration data and (ii) a first set of host file systems storing host data; and wherein forming the destination VSP includes:

providing (i) a second set of configuration file systems to store destination VSP configuration data and (ii) a second set of host file systems to store a copy of the host data, the first and second sets of configuration file systems being transparent to the set of host computers, and the first and second sets of host file systems being visible to the set of host computers.

20. A computer program product as in claim 19 wherein the first set of configuration file systems and the first set of host file systems include existing inode structures to store the data using the block pointers having the first block pointer size defined by the source file system format; and wherein providing the second set of configuration file systems and the second set of host file systems includes:

provisioning the second set of configuration file systems and the second set of host file systems with new inode structures to store the copied data using the block pointers having the second block pointer size defined by the destination file system format.

21. A computer program product as in claim 20 wherein synchronizing the state changes between the source VSP and the destination VSP includes:

while processing host read requests from the second set of host file systems of the destination VSP using the new inode structures having the second block pointer size, copying new data stored in the first set of host file systems of the source VSP, and storing the copied new data in the second set of host file systems of the destination VSP using the new inode structures having the second block pointer size.

* * * * *